J. HORSFALL.
NUT LOCK.
APPLICATION FILED FEB. 27, 1920.
1,368,151.
Patented Feb. 8, 1921.
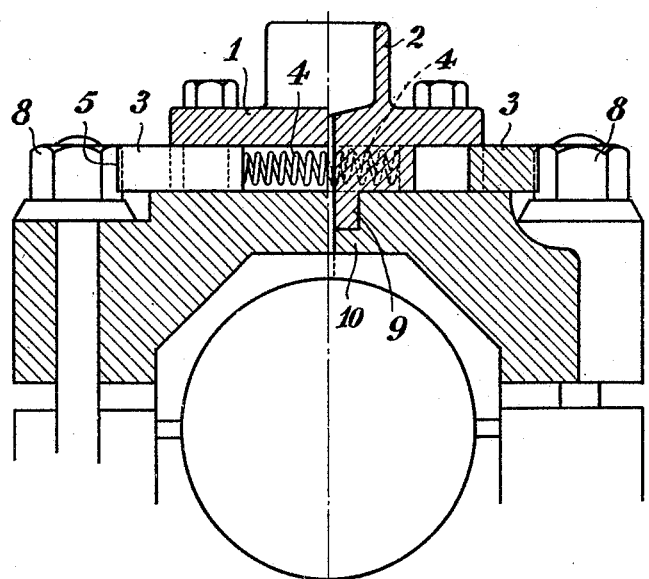
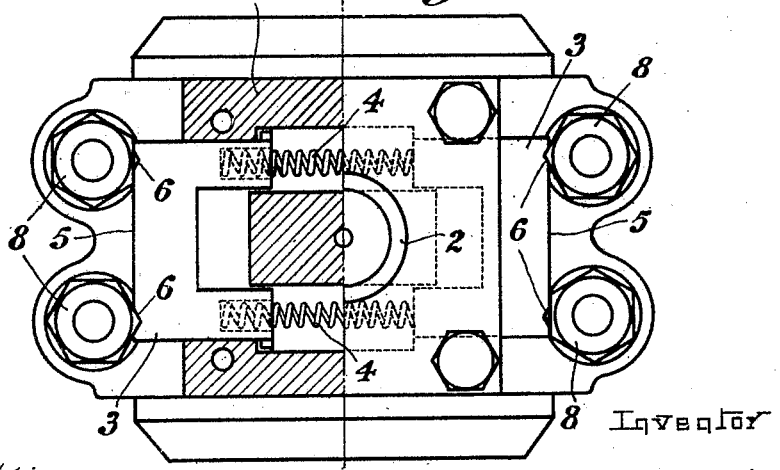
Witnesses
R. S. Finotti
H. W. Duvall
Inventor
John Horsfall
By
Sturtevant & Mason,
Attorneys

UNITED STATES PATENT OFFICE.

JOHN HORSFALL, OF BRADFORD, ENGLAND.

NUT-LOCK.

1,368,151.                   Specification of Letters Patent.        Patented Feb. 8, 1921.

Application filed February 27, 1920. Serial No. 361,838.

*To all whom it may concern:*

Be it known that I, JOHN HORSFALL, subject of the King of Great Britain, residing at Bradford, in the county of York and Kingdom of England, have invented certain new and useful Improvements in Nut-Locks, of which the following is a specification.

The present invention relates to an improved nut lock, more particularly suitable for the securing of the nuts on the bolts or set-screws of shaft bearings but obviously applicable to a variety of other purposes.

An object of the present invention is to prevent unpredetermined rotation of a nut due to vibration and yet to allow of instantaneous adjustment by means of any ordinary spanner.

According to this invention a spring controlled plunger is adapted to engage the flat or edge of a nut.

The invention is more particularly described with reference to the accompanying drawings in which:—

Figure 1 is a part sectional elevation of the invention applied to the cap bolts of a shaft bearing.

Fig. 2 is a corresponding plan view.

A cap 1 which may be integral with a lubricant chamber 2 having a perforation leading to the bearing, is adapted to receive one or more plungers 3 controlled by springs 4, one spring thereby controlling, in the arrangement shown, a pair of plungers pushing these radially outward. The plungers have flat faces 5 which are preferably notched as at 6 so that if a nut has six faces it can be locked in either of twelve positions, six in which the flat of the plunger 5 engages a flat on the nut and six in which the notch 6 engages an edge of the nut 8. The cap 1 is preferably arranged with a hollow pin 9 such that it may be wedged by means of this pin into the usual oil lubricant channel in the top piece 10 of the bearing.

I declare that what I claim is:—

A nut lock comprising in combination a plunger, means to guide said plunger radially to the center of the nut to be locked, a spring pressing said plunger elastically against the nut and capable of contraction by the difference in distance between the flats and angles of the nut to be locked, and a hollow taper pin integral with said guides for fitting the device to a bearing cap.

In witness whereof, I have hereunto signed my name this 12th day of February, 1920, in the presence of two subscribing witnesses.

JOHN HORSFALL.

Witnesses:
EDWARD BEANLAND KNIGHT,
HENRY HERBERT HORSFALL.